United States Patent [19]
Stengel et al.

[11] 3,763,427
[45] Oct. 2, 1973

[54] PANORAMIC AND AUTOMATIC RETURN LOSS MEASURING SYSTEM

[75] Inventors: Renato Stengel; Basilio Catania, both of Milano, Italy

[73] Assignee: GTE International Incorporated, New York, N.Y.

[22] Filed: July 11, 1972

[21] Appl. No.: 270,613

[30] Foreign Application Priority Data
Jan. 22, 1972  Italy .............................. 19704 A/72

[52] U.S. Cl. ............................................. 324/57 R
[51] Int. Cl. ............................................ G01r 27/00
[58] Field of Search ........................ 324/57 R, 57 SS

[56] References Cited
UNITED STATES PATENTS
3,153,192  10/1964  Pidhayny et al. ............. 324/57 R X
3,371,273  2/1968  Alford ................................ 324/57 R Primary Examiner—Stanley T. Krawczewicz
Attorney—Theodore C. Jay

[57] ABSTRACT

A system for determining the return loss of an impedance device employs a bridge network coupled to the impedance. The frequency of an input signal to the bridge network is swept continually from a first frequency to a second frequency and then back to the first frequency. A conversion circuit converts the varying frequency input and output signals of the bridge network to a pair of fixed frequency signals which are alternately coupled via a switch to the input connection of a logarithmic channel the output of which is connected to the vertical deflection terminal of an oscilloscope. A signal proportional to the logarithm of the bridge network input signal is displayed in the oscilloscope when the frequency is being swept in a first direction and a signal proportional to the logarithm of the bridge network output signal is displayed when the frequency of the input signal is being swept in the second direction, thus enabling the return loss to be read directly from the oscilloscope.

5 Claims, 3 Drawing Figures

PANORAMIC AND AUTOMATIC RETURN LOSS MEASURING SYSTEM

BACKGROUND OF THE INVENTION

This invention relates to return loss tests performed by a sweep method with an automatic calibration and zero setting which are particularly suitable for baseband (BB) and intermediate frequency (IF) input impedance of wide band radio links.

As known, return losses L of an impedance $\overline{Z}$ with respect to a resistance R (generally equal to 75 Ω in BB and IF) are defined by the equation:

$$L = -20 \log_{10} |(\overline{Z} - R/\overline{Z} + R)| \qquad (1.)$$

Generally, they are tested by means of an impedance bridge the output signal U of which is correlated to the input signal E by the relation:

$$\overline{U} = (\overline{E}/8)(\overline{Z} - R/\overline{Z} + R) \qquad (2.)$$

By amplitude detecting this signal U it is therefore possible to determine the return losses of combining equations (1) and (2).

$$L = -20 \log_{10} |8 \, (\overline{U}/\overline{E})| \qquad (3.)$$

Since generally the signal U is very low (i.e. the more Z approximates R the lower is the signal) to avoid serious errors due to the harmonics of the main signal E and other signals which can be at a level comparable to that of the useful signal U, it is preferred practically to provide a suitable selective amplifier before the signal amplitude detector.

One of the most commonly used methods is the heterodyne method. By this method two oscillators are used, i.e. a master oscillator which supplies the signal E to the impedance bridge, at the desired frequency $f_1$, and a slave oscillator having a frequency $f_2$ locked to $f_1$ and differing from that by a fixed quantity $f$. The main signal E is applied to the input of the impedance bridge to a branch of which the unknown impedance Z is connected.

The signal U at the output of the impedance bridge is applied to the input of the converter to which also the signal having a frequency $f_2$ from the slave oscillator is supplied. At the output of the converter a signal appears having a frequency $f = f_2 - f_1$ the amplitude of which (if the converter is linear) is proportional to the reflection coefficient $\overline{\Gamma}$:

$$\overline{\Gamma} = (\overline{Z} - R/\overline{Z} + R) \qquad (4.)$$

This signal of frequency $f$ is supplied to a selective amplifier through a calibrated attenuator and a variable attenuator which is not necessarily calibrated.

The output from the selective amplifier is connected via a switch to an amplitude detector which in turn supplies a d.c. voltage to the vertical deflection Y of an oscillator. The d.c. signal is proportional to the amplitude of the signal U at the output of the impedance bridge.

The test is performed, by comparing this d.c. voltage to that supplied by the reference voltage generator. A sweep signal generator supplies both the pilot signal of the master oscillator and the slave oscillator and the horizontal deflection signal X of the oscilloscope.

For the following reason this method has the disadvantages of requiring continuous manual adjustments and preventing the test from being automated;

a. Since the signal U is proportional to E, according to equation (2), and the level of the signal E is in turn determined on the basis of the level of the signal applicable to the impedance Z (which can change for example between + 10 dBm and − 20 dBm), a change in the signal E is reflected on the display of the instrument and therefore it should be reset to zero each time the level of E is changed. This zero setting is effected generally by removing the impedance Z from the impedance bridge (i.e. by setting artificaly $Z = \infty$) or substituting it by a short circuit ($Z = 0$) so that on the basis of (1) it is identically $L = 0$, and by adjusting the variable (non calibrated) attenuator in such a manner as to cause the reference trace to coincide with the test trace on the oscillograph. During this operation the calibrated attenuator is fully inserted.

b. The test is performed by connecting the unknown impedance $\overline{Z}$ to the impedance bridge and acting on the calibrated attenuator so as to cause the test trace to coincide with the reference trace. The return losses are given by the attenuation difference (in dB) of the calibrated attenuator between the prior zero setting value and the present test value.

A solution is intended to overcome the above mentioned disadvantages has been suggested by A. Alford in U.S. Pat. NO. 3,371,273 entitled "Automatic Impedance Measuring System Utilizing a Hybrid-like Network Operative Over a Wide Range of Frequencies."

However, the technique taught by Alford has several disadvantages:

a. The solution suggested by Alford does not result in a direct test of L, according to (b), as is requested by many international Committees, but in a vectorial test of the reflection coefficient $\overline{\Gamma}$, according to (4). Since the oscillographic display takes place on the Smith chart, the value of the return losses L must be calculated according to (1). In addition, the oscillographic display requires a very wide dynamics and the reading of high return losses (30 to 40 dB) is difficult and inaccurate.

b. In the solution suggested by Alford the test signal and the reference signal travel through two separate channels and the automatic gain control which must be capable of making up for the differences in the absolute level at which the test is being performed, implies that the two test and reference signal amplifiers be equal at all operation levels.

The capability of changing the level of the input signal to the impedance bridge within a wide range of values (for instance from + 10 dBm to − 20 dBm) is much useful in the test of the return losses of active two-port networks, both because it enables to operate always with the proper input signal according to the rating of the equipment to be tested so as to avoid saturation, and enables, by performing several tests at different levels, to notice possible changes in the return losses.

It would therefore be advantageous, and it is one of the objects of this invention, to provide a system for reading the return losses directly on the oscillograph without requiring additional calculations.

A second object of this invention is to preclude a channel balance problem by having the test signal and the reference signal directed through the same channel.

SUMMARY OF THE INVENTION

An automatic return loss sweep test system according to the present invention includes a swept frequency generation means having an output connection and being operative to generate an output signal having a predetermined amplitude and having its frequency swept from a first frequency to a second frequency and back to the first frequency. An impedance bridge has an impedance device coupled thereto, an input connection coupled to the output connection of the swept frequency generation means and an output connection and is operative to generate an output signal proportional to the reflection coefficient of the impedance device.

A conversion means, coupled to the swept frequency generation means and the impedance bridge, converts the swept frequency generation means output signal and the impedance bridge output signal to signals having substantially the same frequency. A switching means coupled between the conversion means and a logarithmic means alternately switches the input of the logarithmic means to receive the converted output signal of the swept frequency generation means and the converted output signal of the impedance bridge.

A display means has a first axis coupled to the output connection of the logarithmic means and a second display axis coupled to the swept frequency generation means. The display means is operative to display the output signal of the logarithmic means in time relationship with the output signal of the swept frequency generation means.

DESCRIPTION OF THE DRAWINGS

The invention will be better understood from the following detailed description, taken in conjunction with the accompanying drawings in which.

DETAILED DESCRIPTION OF THIS INVENTION

Figure 1:
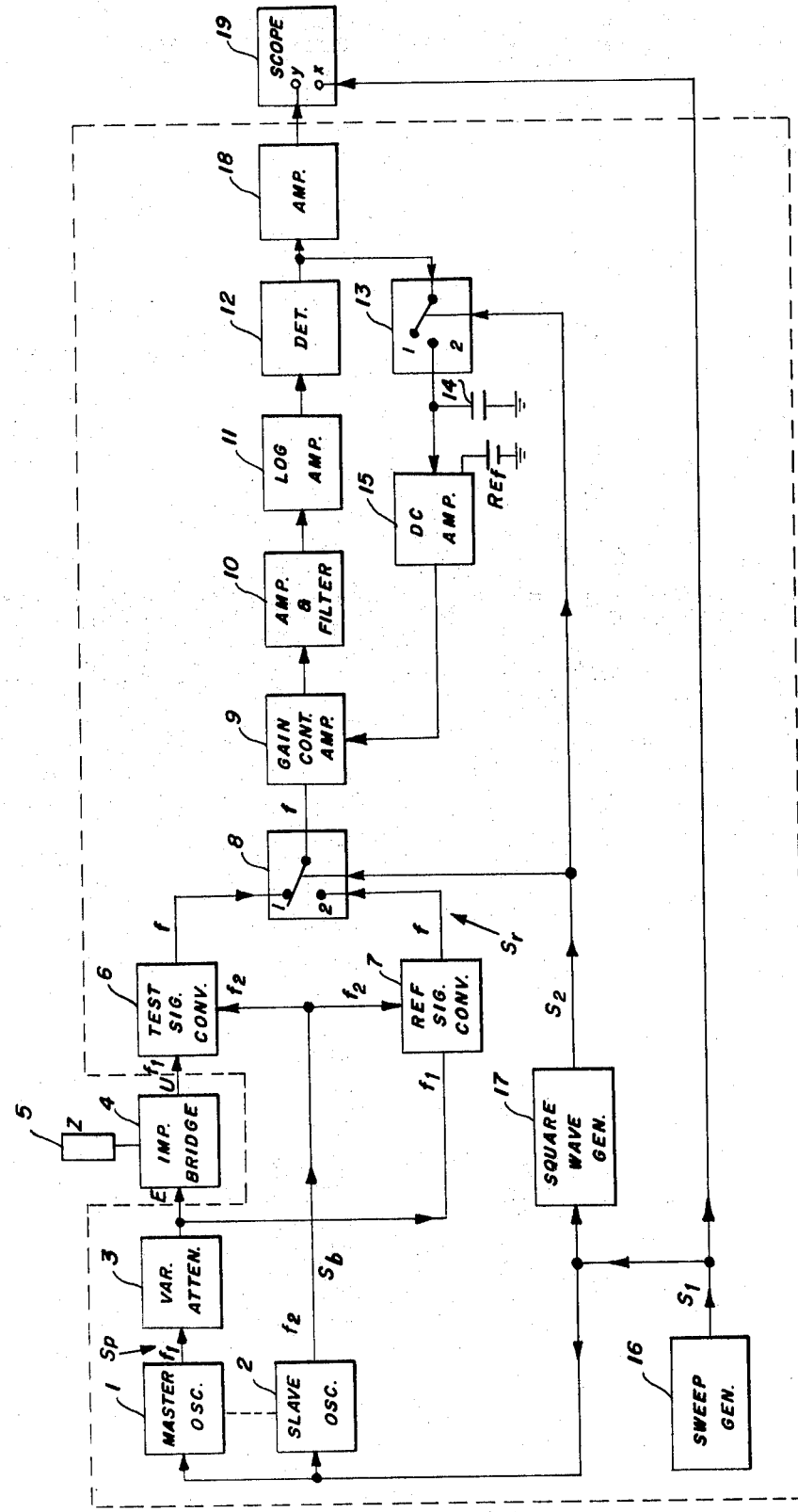
FIG. 1 is a block diagram of the test equipment in a possible embodiment thereof.

Referring to FIG. 1, a master oscillator 1 generates the main signal Sp having a frequency $f_1$. The frequency $f_1$ is changed in the desired range by the sweep signal $S_1$ from the generator 16 which drives the master oscillator 1. The main signal Sp is supplied to a variable attenuator 3 where the signal level can be adjusted to the requisite value for the test.

At the output of the variable attenuator 3 the main signal Sp is directed to a reference signal converter 7 and to an impedance brdige 4 to which an unknown impedance Z, 5, is connected. The output of the impedance bridge 4 is connected to a test signal converter 6.

Supplied to the other input of the converters 6 and 7 is the beat signal Sb having a frequency $f_2$ which is generated by the slave oscillator 2. The slave oscillator is driven by the same sweep signal $S_1$ from the generator 16 which drives also the master oscillator 1, as stated above. Means such as an AFC circuit are provided to keep the frequency $f_2$ of the slave oscillator locked to the frequency $f_1$ of the master. The variation law of the frequency $f_2$ is therefore the same as that of the frequency $f_1$ and the frequency difference $f = f_2 - f_1$ keeps constant. At the output of the test signal converter 6 a signal Sm with a fixed frequency $f$ appears. The amplitude of signal Sm is proportional to the output signal U from the impedance bridge 4 and therefore also to the reflection coefficient $\Gamma$ of the unknown impedance Z, 5. The signal Sm will be referred to hereinafter as the "test signal."

At the output of the reference signal converter 7 a signal Sr with a fixed frequency $f$ appears having an amplitude proportional to the input signal E to the impedance bridge 4. The signal Sr will be referred to hereinafter as the "reference signal." Both the test signal Sm and the reference signal sr are supplied to the electronic switch 8 which is adapted to apply either of them to the input of a gain controlled amplifier 9.

The pilot or control signal of the electronic switch 8 is supplied by the square wave generator 17.

Figure 2:
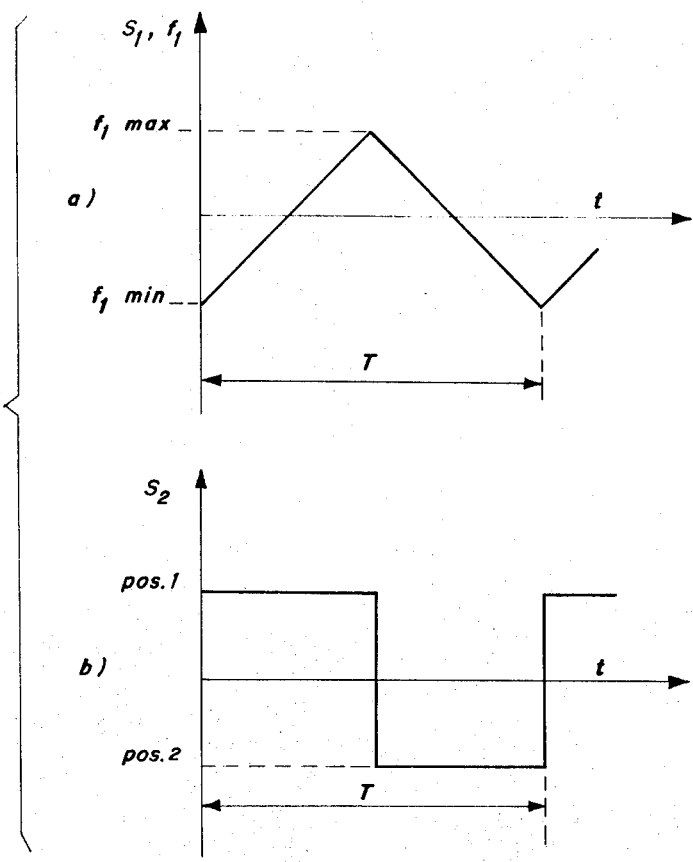
FIG. 2 is a display of the most important waveforms.

This generator is a device which is operative to generate at its output connection a square wave signal having an edge in correspondence to the maximun value $f_{1\ max}$ of the frequency $f_1$ of the main signal Sp, and the other edge in correspondence to the minimum value $f_{1\ min}$. Such a device can be realized in several ways; for example the sweep signal $S_1$ which drives the master oscillator 1 can be shifted by 90° and squared. More particularly, in waveform (a) of FIG. 2, the changes of the sweep signal $S_1$ and the main signal frequency $f_1$ versus time are plotted, which have the same shape: Waveform (b) of FIG. 2 is a plot of the signal $S_2$ which drives both the electronic switch 8 and an electronic circuit breaker 13.

It is apparent from the above that during a half period T/2 of the sweep signal $S_1$ the electronic switch 8 passes the test signal, Sm during the next half period it passes the reference signal Sr.

The output from the gain controlled amplifier 9 is connected to the input of the selective amplifier filter 10 which is required both to filter out the harmonics of the test signal Sm and the reference signal Sr and to minimize the equivalent noise bandwidth. The output from the selective amplifier 10 is connected to a logarithmic amplifier 11 which follows the logarithmic law according to (3). The output of the logarithmic amplifier 11 is connected to a linear amplitude detector 12 which supplies to the electronic switch 13 and to an output amplifier 18 a voltage proportional to the logarithm alternatively of the signal U and signal E.

An electronic circuit breaker 13 is driven by the same square wave signal $S_2$ supplied by the generator 17 which controls the electronic switch 8.

The output voltage of the amplitude detector 12 is applied to the vertical deflection Y of an oscilloscope 19 through an output amplifier 18, whereas the sweep signal $S_1$ from the generator 16 is applied to the horizontal deflection X.

During the half period of the sweep signal when the electronic swtich 8 applies the reference signal Sr to the input of the variable gain amplifier 9, the electronic circuit breaker 13 is closed (position 2) and a capacitor 14 charges in a very short time at the output voltage of the amplitude detector 12 which is proportional to the logarithm of the amplitude of the reference signal Sr. This voltage is applied to a d.c. amplifier 15 which provides a gain control signal which in turn is supplied to the gain controlled amplifier. In this manner the d.c. reference voltage at the output of the amplitude detector 12 is kept constant with the amplitude of the reference signal Sr which in turn is proportional to the amplitude of the main signal Sp at the input of the impedance bridge 4.

During the next half period of the sweep signal $S_1$ when the electronic switch 8 supplies to the input of the gain control amplifier 9 the test signal $Sm$, the electronic circuit breaker 13 is open, the capacitor 14 remain charged at the voltage of the preceeding cycle, and the gain control signal of the amplifier 9 does not change.

The output voltage from the amplitude detector 12 is proportional to the logarithm of the test signal amplitude and therefor of the output signal from the impedance bridge 4.

Figure 3:
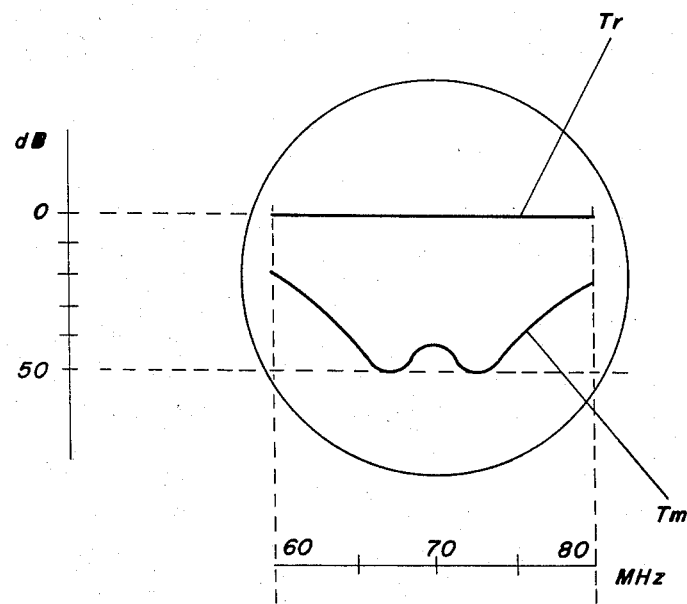
FIG. 3 shows the oscillographic display of the test.

Referring to FIG. 3, it can be noted that two traces are visible on the screen of the oscillograph 19; the upper trace $Tr$ is the reference trace which is porportional to the logarithm of the amplitude of the signal E at the input of the impedance bridge 4, the lower trace $Tm$ is the test trace which is proportional to the logarithm of the amplitude of the signal U at the output of the impedance bridge 4.

Therefore due to the provision of the logarithmic amplifier 11, the spacing between the two traces is proportional to the difference of the logarithms of the two above cited amplitudes, and consequently can be calibrated directly in dB/cm which, as is seen from (3), enables an immediate reading of the return losses L.

This reading is quite independent of the level of the signal E applied to the input of the impedance bridge 4 within the limits of the dynamics of the gain controlled amplifier 9.

As it is apparent from the above stated, this invention overcomes all of the mentioned disadvantages in a simple and inexpensive manner, resulting in an oscillographic display of the return losses which needs no manual operation, is permanently calibrated in decibel, is independent within wide limits on the level of the signal applied to the unknown impedance and therefore can be used for test automation.

While but one embodiment of this invention has been illustrated and described, it is obvious that many changes and mofications can be made therein without departing from the scope of the invention.

What is claimed is:

1. A system for determing the return loss of an impedance device comprising
    swept frequency generation means having an output connection and being operative to generate an output signal having a predetermined amplitude had having its frequency swept from a first frequency to a second frequency and back to said first frequency;
    an impedance bridge having the impedance device coupled thereto, and input connector coupled to the output connection of said swept frequency generation means and an output connection and being operative to generate at its output connection an output signal proportional to the reflection coefficient of said impedance device;
    conversion means having input connections coupled to the input connection and output connection of said impedance bridge and said swept frequency generation means and being operative to convert the output signal of said swept frequency generation means and the output signal of said impedance bridge to signals having a substantially the same frequency;
    logarithmic means having an input connection and an output connection and being operative to generate at its output connection a signal proportional to logarithm of a signal at its input connection;
    switching means having input connections coupled to said conversion means, a control connection coupled to said swept frequency generation means and an output connection coupled to the input connection of said logarithmic means and being operative in response to a signal at its control terminal to alternately couple the converted output signal of said swept frequency generation means and the converted output signal of said impedance bridge to said logarithmic means; and
    display means having a first display axis coupled to the output connection of said logarithmic means and a second display axis coupled to said swept frequency generation means and being operative to display the output signal of said logarithmic means in time relationship with said output signal of said swept frequency generation means.

2. A system for determining the return loss according to claim 1 wherein said swept frequency generation means comprises
    sweep generator being operative to generate a predetermined sweep signal;
    a master oscillator having an input connection coupled to said sweep generator and an output connection coupled to said impedance bridge and to said conversion means and being operative in response to said predetermined sweep signal to generate a signal which sweeps in frequency from a first frequency to a second frequency and back to said first frequency; and
    a slave oscillaor having an input connection coupled to said sweep generator and an output connection coupled to said conversion means and being operative to generate a signal which sweeps in frequency from a third frequency to a fourth frequency and back to said third frequency.

3. A system for determining the return loss according to claim 2 wherein said conversion means includes
    a first conversion device having a first input connection coupled to the output connection of said impedance bridge, a second input connection coupled to said slave oscillator and an output connection coupled to said switching means and being operative to convert the output signal from said impedance bridge to a signal having a fixed frequency; and
    a second conversion device having a first input connection coupled to the input connection of said impedance bridge, a second input connection coupled to said slave oscillator, and an output connection coupled to said switching means and being operative to convert the input signal to said impedance bridge to a signal having substantially the same frequency of said first conversion device.

4. A system for determining the return loss according to claim 3 wherein said logarithmic means includes
    a logarithmic amplifier having an input connection coupled to the output connection of said switching means and an output connection and being operative to generate at its output connection an output signal proportional to the logarithm of a signal at its input connection said output signal having a predetermined frequency; and detection means having an input connection coupled to the output connection of said logarithmic amplifier and an output connection coupled to the first display axis of said display means and being operative to reduce the output signal from said logarithmic amplifier to a baseband signal.

5. A system for determining the return loss according to claim 4 further including gain control means coupled between the output connection of said switching means and the input connection of said logarithmic amplifier and having a gain control terminal, said gain control means being operative in response to a signal at its control terminal to vary the amplitude of a signal passing through it;

a switching circuit having an input connection coupled to the output connection of said detection means, an output connection, and a control terminal and being operative in response to a predetermined level at said control terminal of said switching circuit to couple the output signal of said detection means to its output connection;

reference means having an input connection coupled to the output connection of said detection means, and an output connection coupled to the control terminal of said gain control means and being operative to a direct current signal at its output connection proportional to the baseband signal at its input connection; and square wave generator means having an input connection coupled to said sweep generator and an output coupled to the control terminal of said switching circuit and being operative to generate the predetermined level at the control terminal of said switching circuit when the output signal of said second conversion device is coupled to the input connection of said logarithmic amplifier.

* * * * *